United States Patent
Yuan et al.

(10) Patent No.: US 11,402,714 B2
(45) Date of Patent: Aug. 2, 2022

(54) PIXEL ARRAY SUBSTRATE, A DRIVING METHOD, AND A DISPLAY APPARATUS

(71) Applicant: BOE Technology Group Co., Ltd., Beijing (CN)

(72) Inventors: Lijun Yuan, Beijing (CN); Mingfu Han, Beijing (CN); Haoliang Zheng, Beijing (CN); Guangliang Shang, Beijing (CN); Xing Yao, Beijing (CN); Shunhang Zhang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 662 days.

(21) Appl. No.: 16/344,023

(22) PCT Filed: Sep. 30, 2018

(86) PCT No.: PCT/CN2018/108942
§ 371 (c)(1),
(2) Date: Apr. 23, 2019

(87) PCT Pub. No.: WO2019/214152
PCT Pub. Date: Nov. 14, 2019

(65) Prior Publication Data
US 2021/0356785 A1 Nov. 18, 2021

(30) Foreign Application Priority Data
May 9, 2018 (CN) .......................... 201810437710.9

(51) Int. Cl.
*G02F 1/133* (2006.01)
*G02F 1/1368* (2006.01)
(52) U.S. Cl.
CPC ........ *G02F 1/1368* (2013.01); *G02F 1/13306* (2013.01)

(58) Field of Classification Search
None
See application file for complete search history.

(56) References Cited

U.S. PATENT DOCUMENTS

2013/0222216 A1* 8/2013 Park ..................... G09G 3/3614
345/55
2014/0218347 A1* 8/2014 Lee ...................... G09G 3/3677
349/48
(Continued)

FOREIGN PATENT DOCUMENTS

CN 104090438 A 10/2014
CN 104123923 A 10/2014
(Continued)

OTHER PUBLICATIONS

International Search Report & Written Opinion dated Jan. 30, 2019, regarding PCT/CN2018/108942.

*Primary Examiner* — Benjamin P Sandvik
(74) *Attorney, Agent, or Firm* — Intellectual Valley Law, P.C.

(57) ABSTRACT

The present application discloses a pixel array substrate. The pixel array substrate includes a plurality of pixels arranged in an array having multiple data-input terminals. N columns of subpixels per each column of pixels are associated with N sets of M numbers of data lines. N is an integer equal to and greater than 1 and M is an even number equal to or greater than 2. The pixel array substrate also includes N sets of M numbers of switches coupled respectively to the N sets of M numbers of data lines. Control terminals of each set of M numbers of switches are respectively coupled to M numbers of clock-signal terminals to receive respective clock control signals to control M groups of subpixels in each corresponding one column of subpixels for connecting
(Continued)

with one of the multiple data-input terminals respectively via each corresponding set of M numbers of data lines.

18 Claims, 9 Drawing Sheets

(56) References Cited

U.S. PATENT DOCUMENTS

| | | | |
|---|---|---|---|
| 2015/0379950 A1 | 12/2015 | Sun et al. | |
| 2016/0071463 A1* | 3/2016 | Takahashi | H01L 27/1225 345/76 |
| 2016/0133337 A1* | 5/2016 | Gu | G09G 3/00 377/64 |
| 2016/0322008 A1 | 11/2016 | Sang et al. | |
| 2018/0286332 A1* | 10/2018 | Ma | G09G 3/3614 |

FOREIGN PATENT DOCUMENTS

| | | |
|---|---|---|
| CN | 105913791 A | 8/2016 |
| CN | 106097988 A | 11/2016 |
| KR | 20100072632 A | 7/2010 |

* cited by examiner

PIXEL ARRAY SUBSTRATE, A DRIVING METHOD, AND A DISPLAY APPARATUS

CROSS-REFERENCE TO RELATED APPLICATION

This application is a national stage application under 35 U.S.C. § 371 of International Application No. PCT/CN2018/108942, filed Sep. 30, 2018, which claims priority to Chinese Patent Application No. 201810437710.9, filed May 9, 2018, the contents of which are incorporated by reference in the entirety.

TECHNICAL FIELD

The present invention relates to display technology, more particularly, to a pixel array substrate, a method for driving the pixel array substrate for image display, and a display apparatus having the same.

BACKGROUND

In general, a display panel includes multiple data driver integrated circuits, an array of subpixels, and multiple data lines. Each column of subpixels is connected to one data line. Each data driver integrated circuit is disposed in a region of the display panel to connect with the data line in the region to deliver data signals for driving each subpixel that connected via the one data line. As the display panel is provided with higher resolution in terms of Pixels Per Inch (PPI), the numbers of data lines increase so do the numbers of data driver integrated circuits, causing higher power consumption and disadvantages for designing a display panel with a narrower border. The data line is used to transfer data signals to respective subpixels that connect to the data line. Since each data line is connected to all subpixels in one column, the larger the load to the data line, the larger the decay of the data signal delivered along the data line. This affects display quality of the display panel.

SUMMARY

In an aspect, the present disclosure provides a pixel array substrate. The pixel array substrate includes a plurality of pixels arranged in an array having multiple data-input terminals. Each pixel includes one or more subpixels along row direction. N numbers of columns of subpixels per each column of pixels are respectively associated with N sets of M numbers of data lines. N is an integer equal to or greater than 1, M is an even number equal to or greater than 2; a. Additionally, the pixel array substrate includes N sets of M numbers of switches coupled respectively to the N sets of M numbers of data lines. Control terminals of each set of M numbers of switches are respectively coupled to M numbers of clock-signal terminals to respectively receive M numbers of clock control signals to control M groups of subpixels in each corresponding one column of subpixels to be connected with one of the multiple data-input terminals respectively via each corresponding set of M numbers of data lines.

Optionally, each column of subpixels per each column of pixels includes subpixels of a same color associated with at least one data line. Any two subpixels in respective two columns of subpixels per one column of pixels include subpixels of two different colors.

Optionally, an m-th data line of the M numbers of data lines is coupled to each subpixel in an m-th group of the M groups distributed in every [M·k−(M−m)]-th row in each corresponding one column of subpixels. m is an integer varying from 1 to M, and k is a positive integer.

Optionally, any two data lines from a set of M numbers of data lines associated with one column of subpixels are configured to connect to a same one of tire multiple data-input terminals and any two data lines respectively associated with two neighboring columns of subpixels are configured to connect to two different ones of the multiple data-input terminals.

Optionally, each m-th data line of a corresponding one set of M numbers of data lines associated with each column of subpixels of a same color in all columns of pixels in the array is configured to be controlled respectively by a different switch sharing a same clock control signal received from a same m-th one of the M numbers of clock-signal terminals.

Optionally, each pixel includes a red color subpixel, a green color subpixel, and a blue color subpixel laid along a row direction.

Optionally, each of up to three columns of subpixels of up to three colors selected from the red color subpixel, green color subpixel, and blue color subpixel per column of pixels in the array is associated with a distinct set of M numbers of data lines.

Optionally, each switch includes a switch transistor having a gate electrode served as a control terminal, a first electrode coupled to a corresponding one of the multiple data-input terminals, and a second electrode coupled to a corresponding erne of a distinct set of M numbers of data lines.

Optionally, the twitch transistor is a back channel etch-type transistor, a transistor having an active-layer comprising a metal oxide semiconductor material, or a back channel etch-type transistor having an active-layer comprising a metal oxide semiconductor material.

Optionally, the switch transistor is an etching stop layer type transistor or top-gate type transistor having an active-layer comprising a metal oxide semiconductor material.

Optionally, the set of M numbers of data lines associated with one column of subpixels includes at least two datelines respectively laid on two opposite sides of the one column of subpixels.

Optionally, the pixel array substrate further includes a plurality of gate lines crossing over with insulation from the data lines. Each row of subpixels is associated with one of the plurality of gate lines to receive a gate-turn-on signal with a pulse width. Each of the M numbers of clock control signals has a phase drift from one another of the M numbers of clock control signals but with a same period being M times of the pulse width.

Optionally, the multiple data-input terminals includes two sets of data-input terminals. Each pair of columns of pixels is associated with two distinct data-input terminals respectively from the two sets of data-input terminals configured to supply with data signals with respective two opposite polarities.

In another aspect, the present disclosure provides a method of driving a pixel array substrate. The method includes applying a gate turn-on signal with a pulse width progressively one-after-another to scan through a plurality of gate lines in each frame of displaying time. The plurality of gate lines is respectively associated with a plurality of rows of subpixels in the pixel array substrate. The method further includes applying multiple data signals to respective multiple data-input terminals. Additionally, the method includes laying at least one data line to be associated with each column of subpixels in the pixel array substrate. N numbers of columns of subpixels per each column of pixels is respectively associated with N sets of M numbers of data lines, N is an integer equal to or greater than 1, M is an even number equal to or greater than 2. The method further includes providing M numbers of switches configured to control M groups of subpixels in respective one of N numbers of columns of subpixels per column of pixels to be connected with one of the multiple data-input terminals respectively via a distinct set of M numbers of data lines. Furthermore, the method includes applying M numbers of clock control signals respectively to M numbers of clock-signal terminals that are respectively connected to M numbers of control terminals of the M numbers of switches. Each of the M numbers of clock control signals has a phase shift front one another of the M numbers of clock control signals but with a same period that is M times of the pulse width of the gate turn-on signal.

Optionally, the step of applying multiple data signals to respective multiple data-input terminals includes inputting different data signals one-after-another to each of multiple data-input terminals during each pulse width of the gate turn-on signal being applied to one gate line associated with a corresponding one row of subpixels; and inputting tire M numbers of clock control signals to control inputting the different data signals one-after-another from each of the multiple data-input terminals via respective one of the M numbers of data lines to each subpixel of one group within the M groups of subpixels in the respective one of N numbers of columns of subpixels per column of pixels.

Optionally, a m-th data line of a set of M numbers of data lines is coupled to each subpixel in a m-th group of the M groups distributed in every [M·k−(M−m)]-th row of the respective one of N numbers of columns of subpixels per column of pixels, m is an integer varying from 1 to M, and k is a positive integer.

Optionally, the method further includes connecting any two data lines respectively associated with two neighboring columns of subpixels to two different ones of the multiple data-input terminals configured to respectively supply two data signals with opposite polarities.

Optionally, the step of applying M numbers of clock control signals includes applying at least two clock control signals with a phase shift of $\pi/M$ respectively to two of a set of M numbers of data lines that are respectively connected to two subpixels in respective two neighboring rows.

Optionally, the step of applying multiple data signals includes applying two data signals with same polarity respectively to any two of a set of M numbers of data lines associated with the respective one of N numbers of columns of subpixels and applying two data signals with opposite polarities to any two data lines respectively associated with two neighboring columns of subpixels.

In yet another aspect, the present disclosure provides a display apparatus including a pixel array substrate described herein and a level shifter for providing different clock control signals with a relative phase shift.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described mare specifically with reference to the following embodiments. It is to be noted that the following descriptions of some embodiments are presented herein for purpose of illustration and description only. It is not intended to be exhaustive or to be limited to the precise form disclosed.

Figure 1:
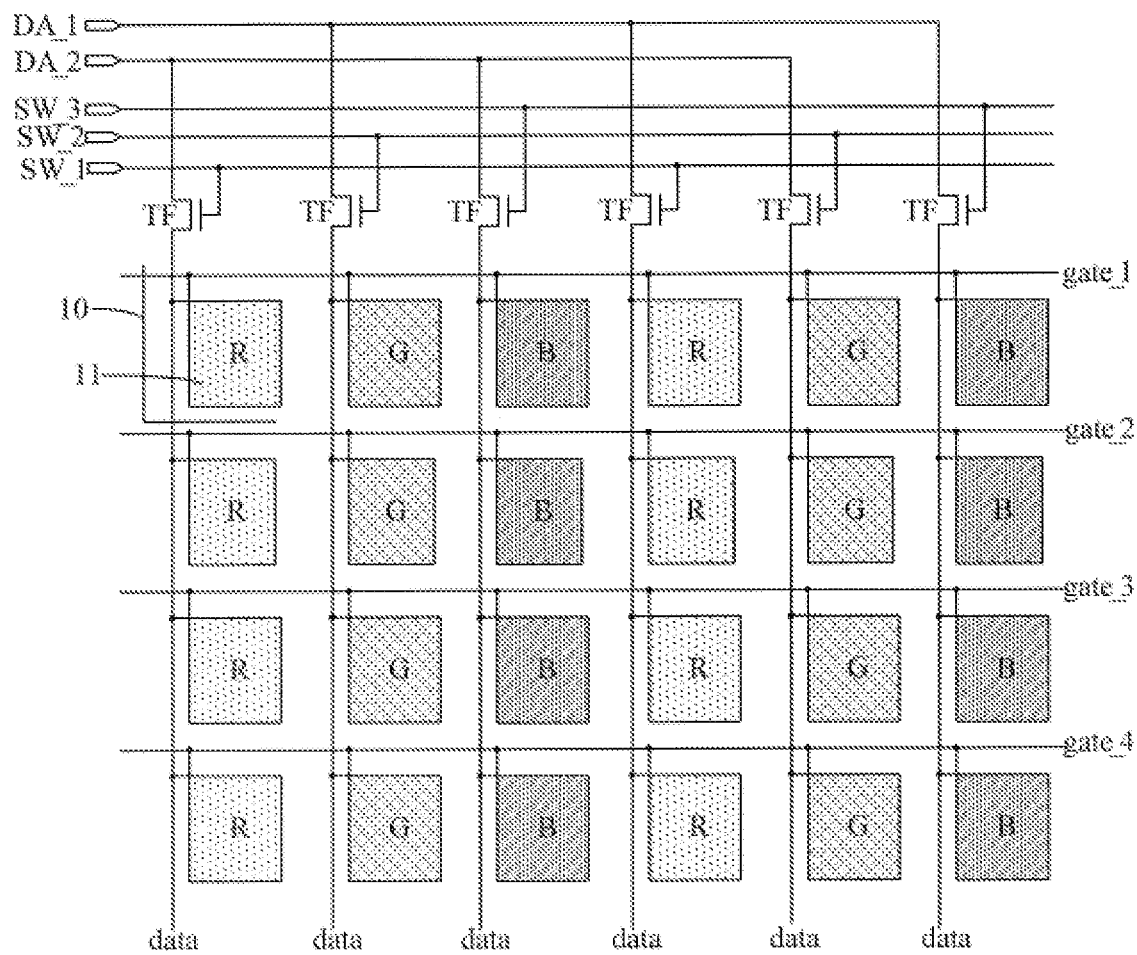
FIG. 1 is a schematic diagram of a pixel array substrate according to an embodiment of the present disclosure.

One way to improve a design of high resolution display panel is to reduce numbers of data driver integrated circuits by adopting a multiplex (MUX) technique. A general scheme of the MUX technique used for the pixel array substrate of a display panel is shown in FIG. 1. The pixel array substrate includes a plurality of pixels 10, multiple data lines (data), multiple transistors (TF) corresponding to the multiple data lines, multiple data-input terminals DA_a (a is an integer equal to or greater than 1 and no greater than A, A is a total number of the date-input terminals in the pixel array substrate), multiple clock signal terminals SW_x (x is an integer equal to or greater than 1 and no greater than X, X is a total number of the clock signal terminals), and a plurality of gate lines gate_b (b is an integer equal to or greater than 1 and no greater than B, B is a total number of gate lines). Each pixel contains multiple subpixels. Far example, A=2, X=3.

As Shown in FIG. 1, each pixel 10 has 3 subpixels 11 of different colors RGB. Each subpixel 11 contains thin-film transistors and pixel electrodes. Each column of subpixels is connected to one data line (data). Each row of subpixels is connected to one gate line (gate_b). The date line connected to the column of subpixels is connected to one data-input terminal DA_a via one transistor TF. The date-input terminal DA_a is used for connecting with a terminal of a data driver integrated circuit (not shown in the FIG. 1). Two columns of pixels give 6 neighboring columns of subpixels, which are associated with 2 data-input terminals. Different subpixels with different colors in different pixels correspond to different transistors that are controlled by a clock control signal from a same clock signal terminal SW_x.

Figure 2:
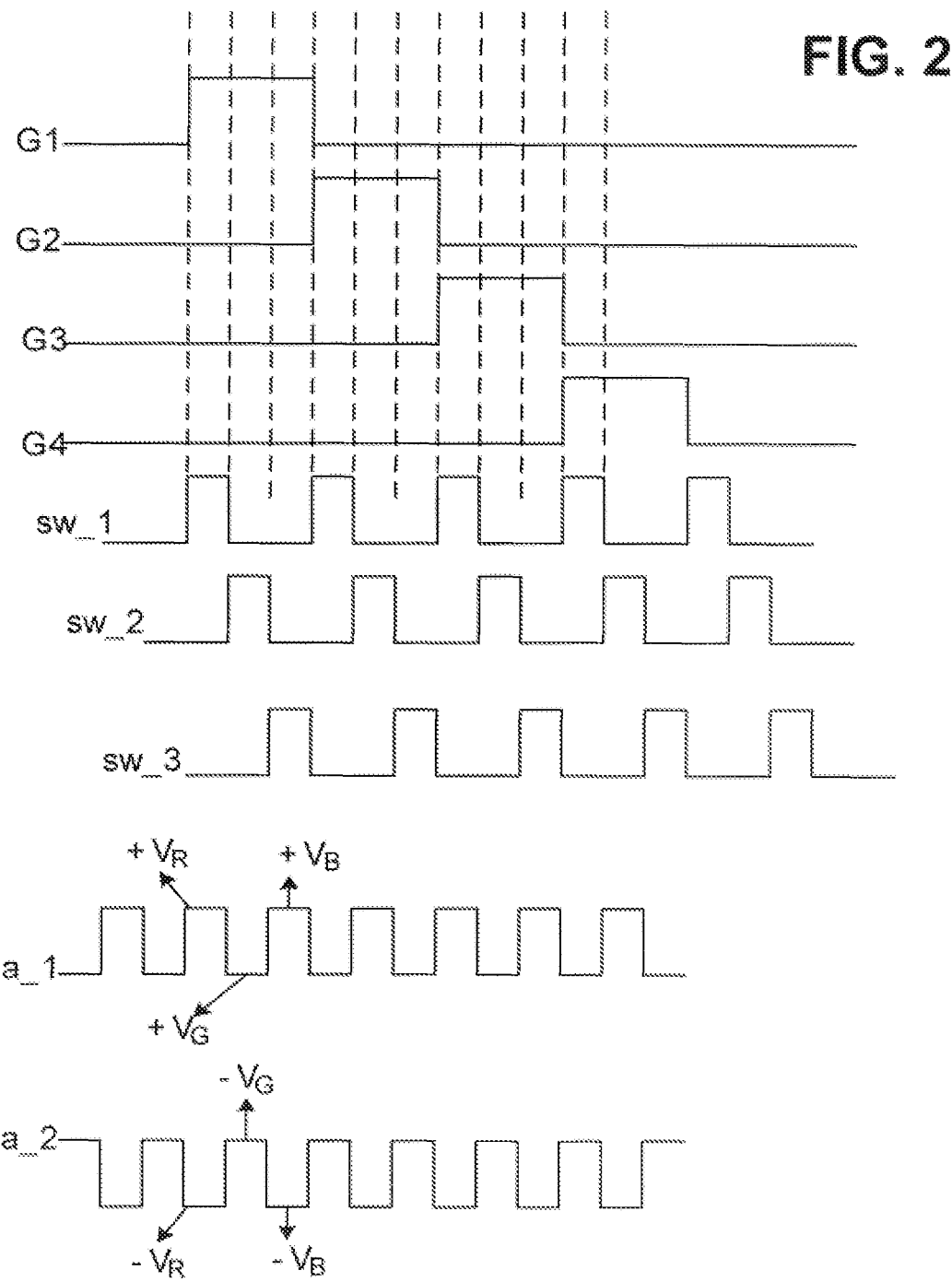
FIG. 2 is a timing waveform of control signals for the pixel array substrate of FIG. 1.

FIG. 2 shows a timing waveform of control signals for the conventional pixel array substrate of FIG. 1. Referring to FIG. 2, G1~G4 represent gate-scanning signals applied respectively to gate lines gate_1~gate_4. Each of diem is used for controlling a thin-film transistor (TFT) in the subpixel 11. A low voltage of G1~G4 represents that a gate-scanning signal is a gate turn-off signal to shutoff the TFT in the subpixel 11, provided that the TFT is an N-type transistor. Reversely, a high voltage of G1~G4 represents that a gate-scanning signal is a gate turn-on signal to make the TFT in the subpixel 11 in a conduction state. sw_1~sw_3 represent clock control signals applied respectively to clock signal terminals SW_1~SW_3. Note, each clock control signal sw_1~sw_3 has a same period $T_{sw}$ which is the same as a pulse width of a gate turn-on signal applied to any gate line. For example, the pulse width of the gate turn-on signal is 3t0, then the period for each clock control signal sw_1~sw_3 is also 3t0. Da_1 and Da_2 represent data signals supplied respectively to the data-input terminals DA_1 and DA_2. In particular, when one gate line gate_b is applied with a gate turn-on signal, a MUX device can supply a turn-on voltage signal alternately to three clock control signals SW_x (i.e., a high voltage signal for sw_1~sw_3 to make the transistor TF in conduction state). This allows the data signal be sequentially loaded from each data-input terminal to three RGB subpixels 11 in one pixel 10. Thus, each terminal associated with the dada driver integrated circuit is able to drive data loading via three data lines, thereby reducing total number of data driver integrated circuits in the display panel.

For a display panel, a power consumption in one frame time (of displaying one frame of image in the display panel) can be expressed as $P=fCV^2$. Here, f represents a frequency of the clock control signal sw_x applied to the clock signal terminal SW_x. C represents parasitic capacitance in all data lines. V represents a voltage difference of a high voltage sw_x signal and a low voltage sw_x signal. For a R subpixel, the power consumption in one frame time is $P_R=f_R C_R V_R^2$. When $f_R$ becomes smaller, the $P_R$ becomes smaller. However, in order to allow the data signals being loaded to each row of subpixels, the frequency $f_R$ for the clock control signal sw_1 cannot be reduced any more under this conventional design of the pixel array substrate and neither can the subpixel power consumption $P_R$. The total power consumption far one pixel $P_M=P_R+P_G+P_B$, which is substantially equal to $3P_R$, with an estimated value of 240 mW based on a simulation.

Since the data line is connected to a column of subpixels via respective source electrodes of dim-film transistors in respective subpixels and the gate line is connected to a row of subpixels via respective gate electrodes of thin-film transistors in respective subpixels, the load on a data line also includes at least parasitic capacitance of the corresponding thin-film transistors connected to the data line. Therefore, a larger load in one data line will cause a larger signal decay in data signal transport.

Accordingly, the present disclosure provides, inter alia, a pixel array substrate, a driving method, and a display apparatus having the same that substantially obviate one or more of the problems due to limitations and disadvantages of the related art.

Figure 3:
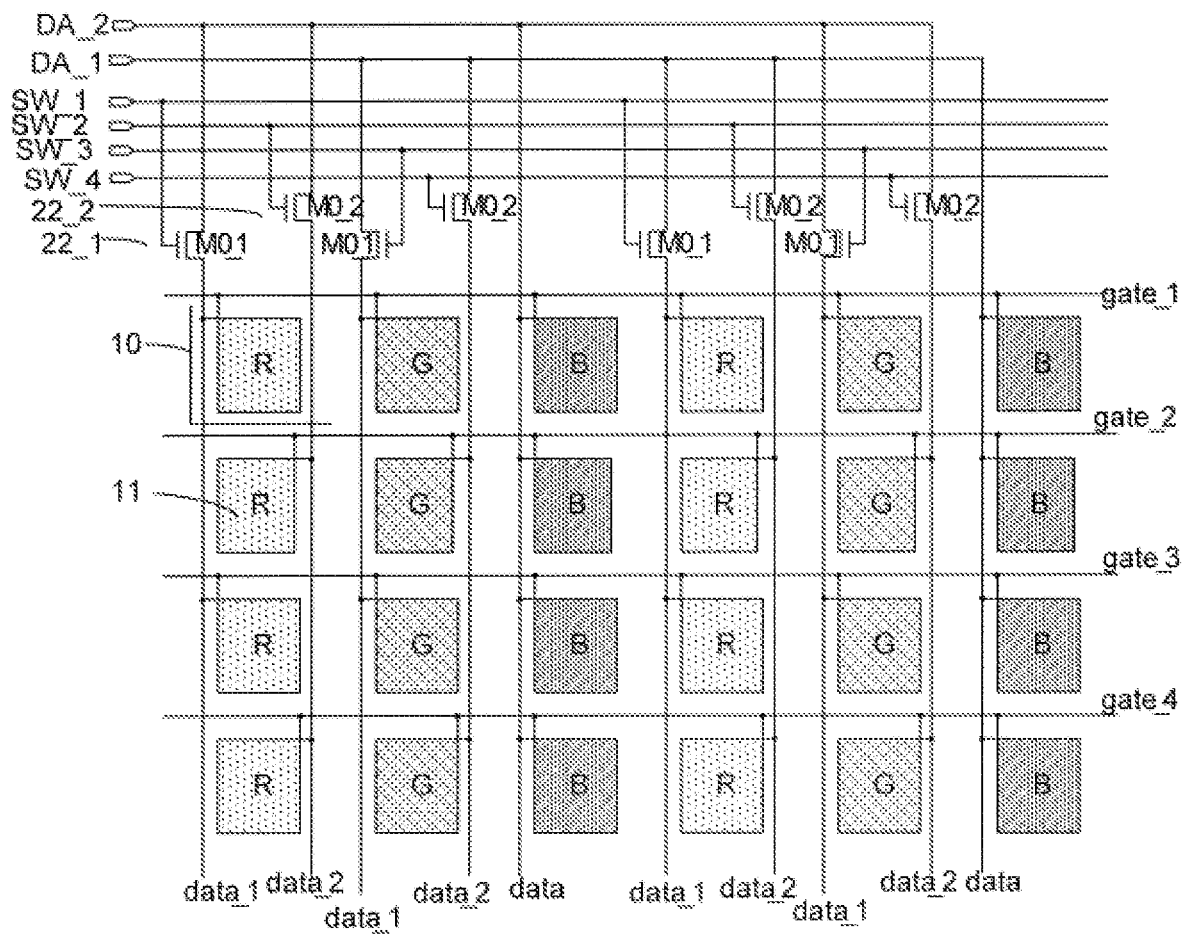
FIG. 3 is a schematic diagram of a pixel array substrate according to an embodiment of the present disclosure.

In one aspect, the present disclosure provides a pixel array substrate. FIG. 3 shows a schematic diagram of a pixel array substrate according to an embodiment of the present disclosure. Referring to FIG. 3, the pixel array substrate includes a plurality of columns of pixels 10, multiple data-input terminals DA_a, multiple data lines (data). Each pixel 10 includes one or more subpixels 11. Each column of subpixels is associated with at least one data line. In an embodiment, N numbers of columns of subpixels 11 per each column of pixels 10 are associated respectively with N sets of M numbers of data lines. N is an integer equal to or greater than 1 and M is an even number equal to or greater than 2.

Additionally, the pixel array substrate includes a switch 22_m corresponding to a respective one data line data_m in a set of the M numbers of data lines associated with a corresponding one column of the N numbers of columns of subpixels. Here m=1, . . . , M. Any data line data_m in the set of M numbers of data lines is coupled with the corresponding switch 22_m to control a connection of the data line data_m with a same data-input terminal out of the multiple data-input terminals DA_a. Further, the switch 22_m has a control terminal is, in one-to-one correspondence, connected to a respective clock signal terminal SW_x out of X numbers of clock signal terminals. In FIG. 3, M=2, i.e., each of the N numbers of columns of subpixels is associated with 2 data lines. X=4, i.e., 4 data lines associated with two neighboring columns of subpixels per one column of pixels are configured to connect with multiple data-input terminals via 4 different switches under control of 4 clock control signals respectively from 4 clock signal terminals.

Figure 4:
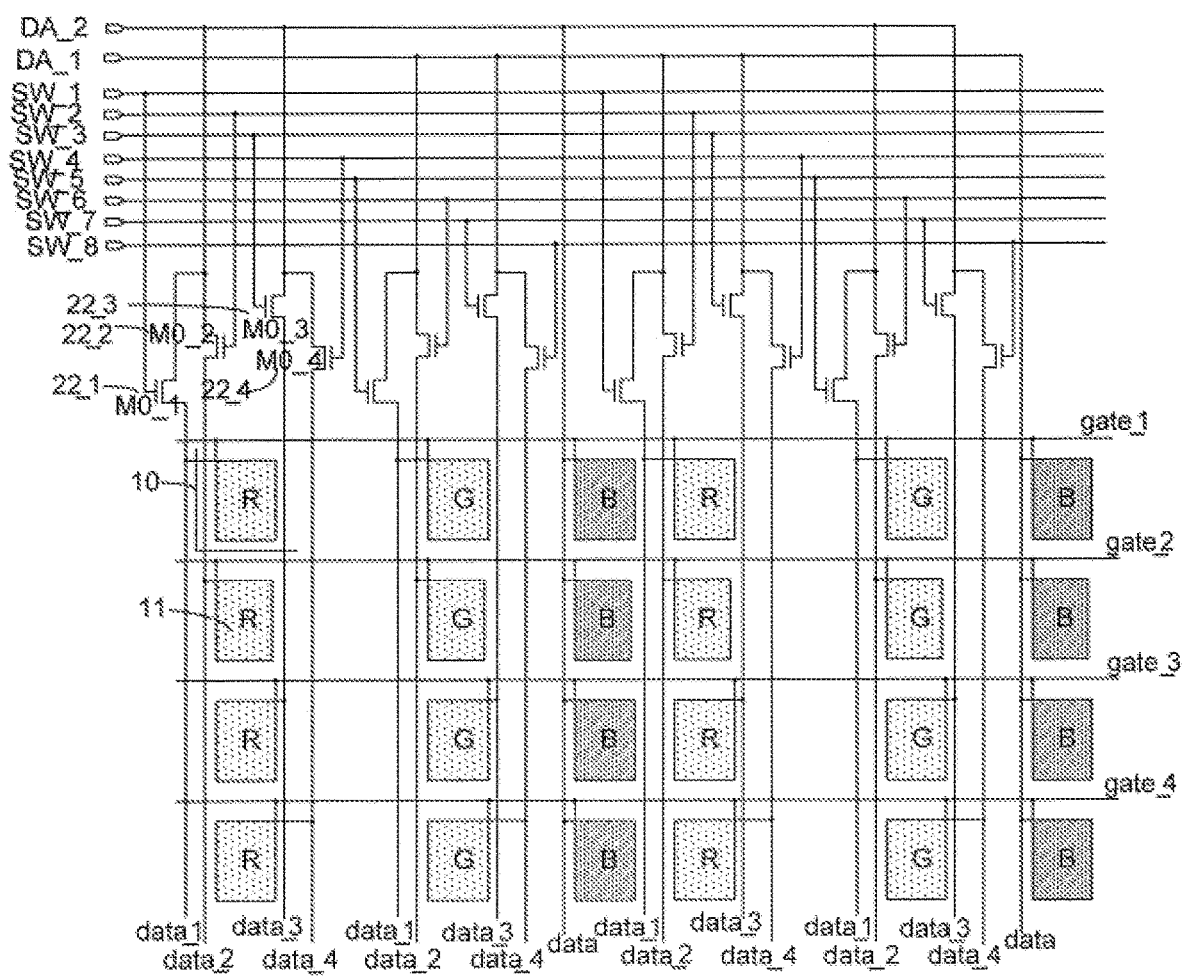
FIG. 4 is a schematic diagram of a pixel array substrate according to another embodiment of the present disclosure.

FIG. 4 is a schematic diagram of a pixel array substrate according to another embodiment of the present disclosure. In FIG. 4, M=4, i.e., each of the N numbers of columns of subpixels is associated with 4 data lines. X=8, i.e., 8 data lines associated with two neighboring columns of subpixels per one column of pixels are configured to connect with multiple data-input terminals via 8 different switches under control of 8 clock control signals respectively from the 8 clock signal terminals.

Furthermore, the pixel array substrate includes a plurality of gate lines gate_b (total number of B) crossing over the data lines with mutual insulation. Each row of subpixels is associated with one gate line for receiving a gate-scanning signal.

In an specific embodiment, a set of the M (even) numbers of data lines includes at least two data lines being respectively disposed to two opposite sides of the corresponding one column of subpixels. In general, tor disposing the M numbers of data lines substantially uniformly to two opposite sides of the corresponding column of subpixels, it can set the number of data lines being equally disposed to each side of the column of subpixels. For example, as shown in FIG. 3, data_1 corresponding to the first column of subpixels is disposed cm a first side and data_2 is disposed on a second side of the first column of subpixels. In FIG. 4, data_1 and data_2 are on one side and data_3 and data_4 are on another side of the corresponding first column of subpixels.

Each pixel 10 includes one or more subpixels 11 having different colors. For example, as shown in FIG. 3 and FIG. 4, a pixel can include a R subpixel of a red color, a G subpixel of a green color, and a B subpixel of a blue color. Optionally, the pixel can include more subpixels of more colors depending on application. Optionally, each column of subpixels in the pixel stray substrate is arranged with subpixels of a same color.

In the embodiment, for each column of pixels, each of N numbers of columns of subpixels of a same color is associated with a distinct set of the M numbers of data lines. Each column of subpixels includes M groups of subpixels. A m-th data line in the set of M numbers of data lines is configured to connect one group of subpixels in the M groups of subpixels that is distributed in every [M·k−(M−m)]-th row of the corresponding one column of subpixels, m is an integer varying from 1 to M. k is an integer serial number starting from 1. For example, as shown in FIG. 3, M=2, a first data line data_1 is connected to subpixels in every (2k−1)-th row (i.e., a first group with all odd number rows) and a second data line data_2 is connected to subpixels in every 2k-th row (i.e., a second group with all even number rows) of the first column of subpixels. In FIG. 4, M=4, the first data line data_1 connects to the first group of subpixels in (4k−3)-th rows, the second data line data_2 connects to the second group of subpixels in (4k−2)-th rows, the third data line data_3 connects to the third group of subpixels in (4k−1)-th rows, and the fourth data line data_4 connects to the fourth group of subpixels in 4k-th rows. By doing so, a load to the data lines corresponding to (beat least one column of subpixels can be reduced so that the power consumption of the display panel can be reduced.

In an embodiment, all data lines associated with each column of subpixels are configured to connect with a same data-input terminal via respective different switches. By doing so, relatively smaller number of data driver integrated circuits (which are supposed to be connected to the data-input terminals) can be employed for driving the display panel. In an specific embodiment, usage of MUX technique helps to reduce the number of data driver integrated circuits.

Generally in the pixel array substrate, each pixel 10 is laid with Y numbers of subpixels 11 of Y different colors sequentially along the row direction. Y is an integer no smaller than 2. For example in FIG. 3 and FIG. 4, Y=3, i.e., each pixel 10 includes a series of a red subpixel R, a green subpixel G, and a blue subpixel B. Of course, the order of the subpixel layout in a pixel can vary, but the layout in each pixel of the pixel array substrate is preferred to be the same. Y can be other number greater than 3 depending on actual applications. The arrangement of subpixel 11 in each pixel 10 allows that each column of subpixel has a same color. Each column of pixels includes three columns of subpixel, a first column of subpixels of red color (R column), a second column of subpixels of green color (G column), and a third column of subpixel of blue color (B column). In an implementation of the present disclosure as shown in FIG. 3 and FIG. 4, up to three columns of subpixels (for example, R column and G column) in each column of pixels are respectively associated with up to three sets of M numbers of data lines with M being an even number no smaller than 2. Optionally, one column of subpixel (for example, B column) is associated with just one data line. For example in FIG. 3, each column of R subpixels of red color per column of pixels is associated with a set of M=2 data lines. In another example of FIG. 4, each column of R subpixels of red color per column of pixels is associated with a set of M=4 data lines.

In the embodiment, any two data lines associated with a same column of subpixels are configured to be connected with a same data-input terminal and any two data lines respectively associated with two neighboring columns of subpixel are configured to be connected to two different data-input terminals to receive two different data signals with opposite polarities. For example, for each pair of columns of pixels as shown in FIG. 3 and FIG. 4, data line(s) associated with an even column of subpixels is connected to a first data-input terminal DA_1 and data line(s) associated with an odd column of subpixels is connected to a second data-input terminal DA_2. DA_1 and DA_2 are supplied with respective two data signals Da_1 and Da_2 with opposite polarities. This configuration allows the pixel array substrate to be operated with a data-polarity reversal effect, improving long-term display quality. This configuration also allows each data-input terminal for providing data signals from one data driver integrated circuit to 3 columns of subpixels via a MUX device, reducing numbers of fee data driver integrated circuits laid in a peripheral border region of fee display panel.

In an embodiment, each m-th data line in a set of M numbers of data lines corresponding to one column of subpixel of a same color for each column of pixels in fee array is configured to be connected with a respective different switch 22_m that shares a same one of the multiple clock signal terminals SW_x. But different subpixels with different colors are associated with different clock signal terminals. Far example, as shown in FIG. 3, for any two data lines associated with a column of R subpixels of red color in any column of pixels in the array, each first data line data_1 of the two data lines connects to a respective switch 22_1 (M0_1) coupled to a same clock signal terminal SW_1 and each second data line of the two data lines connects to another respective switch 22_2 (M0_2) coupled to another clock signal terminal SW_2. Both data lines are coupled to a same one data signal terminal DA_2. For any two data lines associated with a column of G subpixels of green color in any column of pixels in the array, each first data line data_1 of the two data lines connects to a respective switch 22_1 (M0_1) coupled to a same clock signal terminal SW_3 and each second data line of the two data lines connects to another respective switch 22_2 (M0_2) coupled to another clock signal terminal SW_4. Both data lines in the first column of pixels in the array are coupled to a same one data signal terminal DA_1 while both data lines in the next column of pixels in the array are alternately coupled to another one data signal terminal DA_2. But for the column of B subpixels of blue color, in the embodiment, the data line is directly coupled to a data signal terminal that is alternately DA_2 and DA_1 for the first column of pixels the array and the next column of pixels in the array, and so on.

Figure 3A:
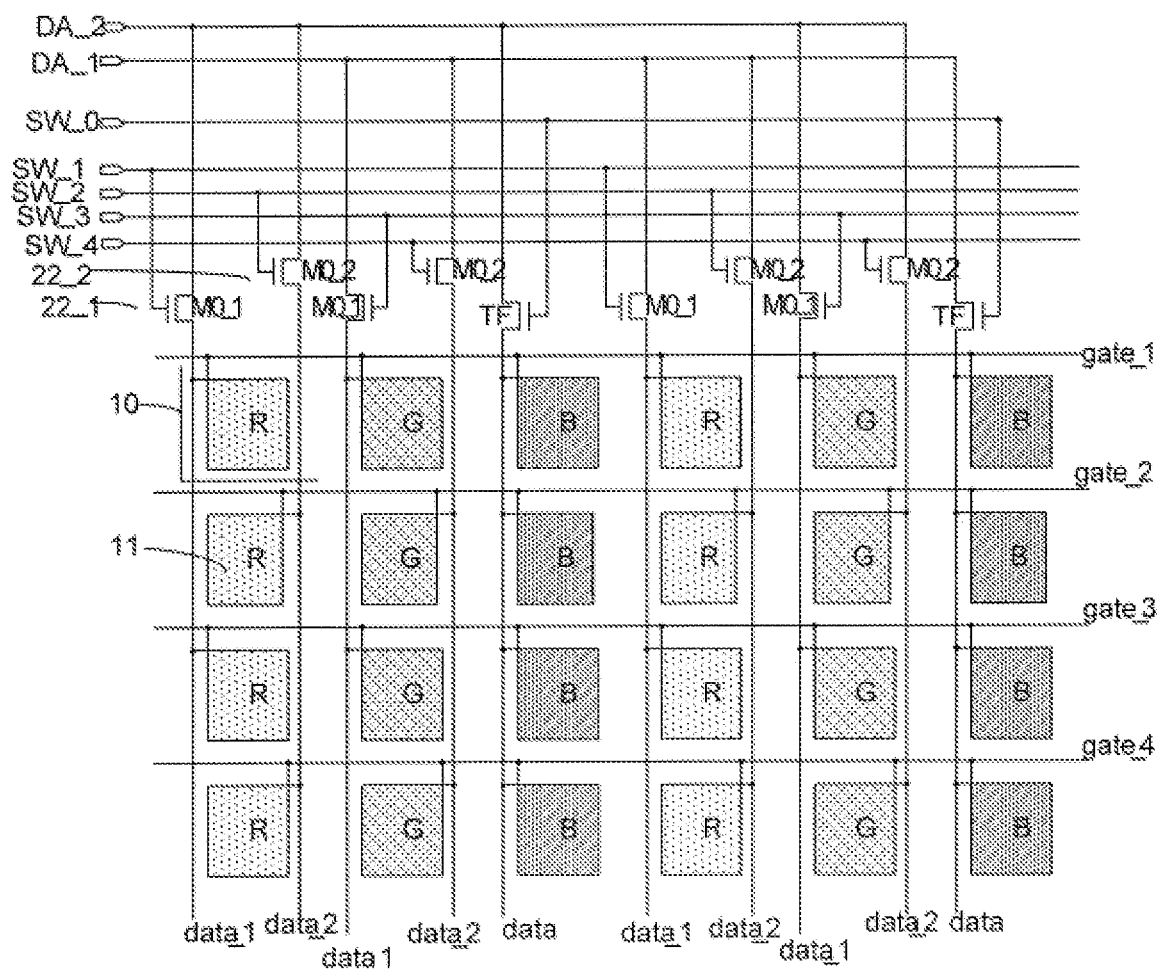
FIG. 3A is a schematic diagram of s pixel array substrate according to an alternative embodiment of the present disclosure.

In an alternative embodiment, as shown in FIG. 3A, the circuitry connections for the set of M numbers of data lines corresponding to columns of R and G subpixels are the same as those shown in FIG. 3, but each data line for the column of B subpixels respectively in the first column or next column of pixels in the array is connected through a thin-film transistor TF to the data signal terminal DA_2 or DA_1. A same clock signal from a clock signal terminal SW_0 is used to control all of these thin-film transistors TF.

Similar to FIG. 3, FIG. 4 shows that each m-th data line in a set of M=4 numbers of data lines corresponding to one column of subpixels of a same color for each column of pixels in the array is configured to be connected with a respective different switch 22_m that shares a same one of the multiple clock signal terminals SW_x (x varying from 1 to 8).

In an embodiment, each switch 22_m includes a switch transistor M0_m. Agate electrode of the switch transistor M0_m is used as a control terminal of the switch 22_m. A source electrode of the switch transistor M0_m is coupled to a corresponding data-input terminal. A drain electrode of the switch transistor M0_m is coupled to a corresponding one data line of the set of M numbers of data lines.

In a specific embodiment, the switch transistor M0_m can be provided as one selected from back channel etching (BCE) type, etching stopper layer (ESL) type, and top gate (TG) type transistor. Optionally, the switch transistor can be an N-type transistor implemented for each switch in the display-driving circuits in the display panel. Optionally, the switch transistor can be a P-type transistor implemented for each switch in the display-driving circuits in the display panel.

In another specific embodiment, the switch transistor includes an active layer that is made by metal oxide semiconductor material which yields relative low leakage current. Optionally, a low temperature poly-silicon (LTPS)

processed material is used to form the active layer of the switch transistor that can be made to be even thinner with lower power consumption.

In an alternative specific embodiment, the display-driving circuit is applied in a passive liquid crystal type display panel. In order to avoid polarization of the liquid crystal layer, the multiple data-input terminals include two sets of data-input terminals, each of the two sets of data-input terminals providing data signal with variable polarities so that a driving electric field can be tuned to change direction. Optionally, this can be achieved by controlling timing of different clock control signals applied to the corresponding data-input terminals. Optionally, two data-input terminals are associated with each pair of columns of pixels, in which a first data-input terminal is associated with each odd number column of subpixels in the pair of columns of pixels to provide a data signal with a first polarity and a second data-input terminal is associated with each even number column of subpixels in the pair of columns of pixels to provide a data signal with a second polarity that is opposite to the first polarity.

Figure 5:
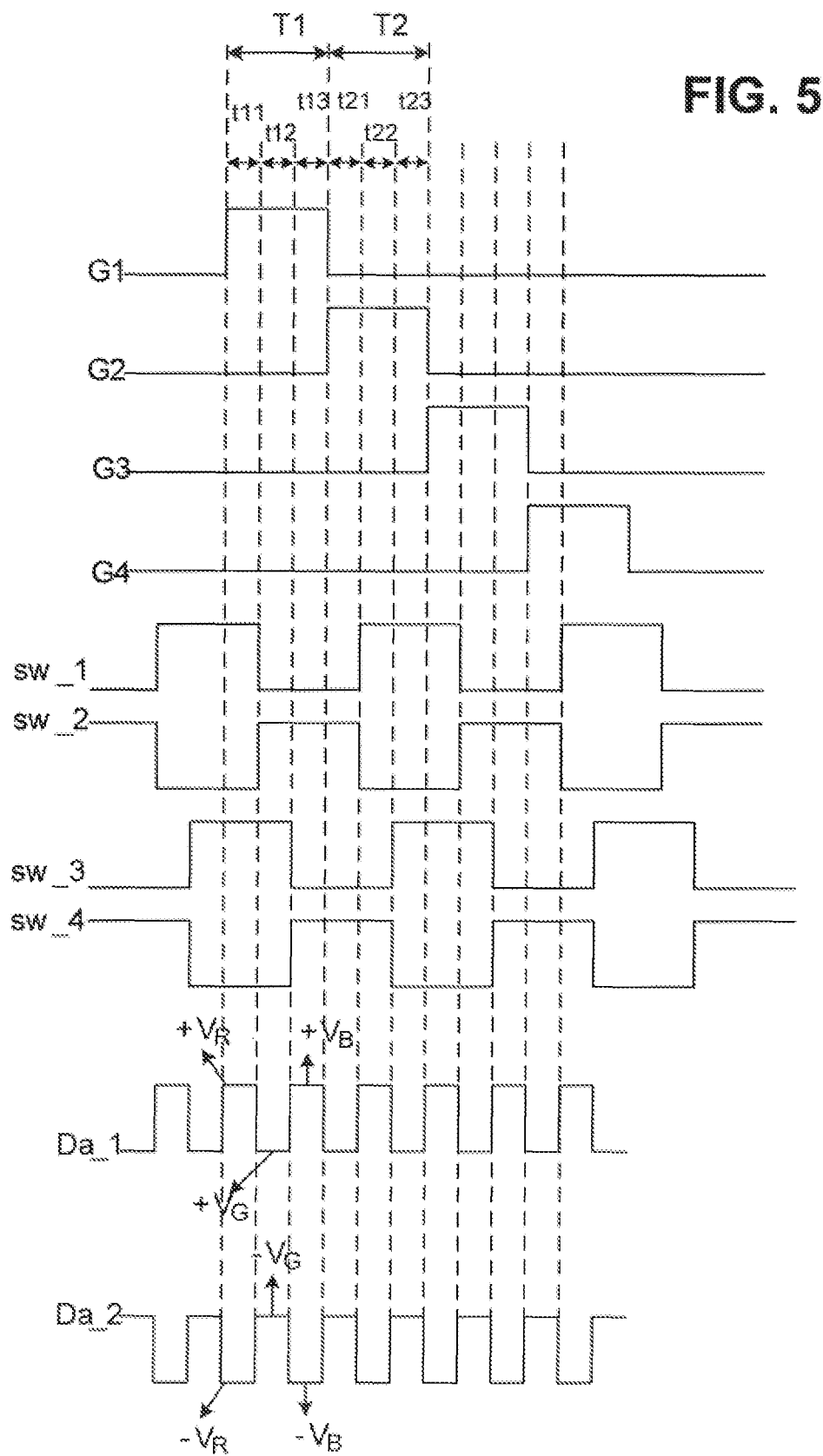
FIG. 5 is a timing waveform of control signals for the pixel array substrate of FIG. 3 according to an embodiment of the present disclosure.

FIG. 5 shows a timing waveform of control signals for the pixel array substrate of FIG. 3 according to an embodiment of the present disclosure. Referring to FIG. 5, G1~G4 represent four gate-scanning signals applied to the respective four gate lines gate_1~gate_4. In particular, a high voltage level with a pulse width in the gate-scanning signal represents a gate turn-on signal while a low voltage level represents a gate turn-off signal. sw_1~sw_4 represent four clock control signals applied respectively to the four clock signal terminals SW_1~SW_4. Each clock control signal, sw_1~sw_4, has a phase shift of π/M from one to another but with a same clock period that is set to be M=2 times of the pulse width of the gate turn-on signal. For example, the pulse width of the gate turn-on signal is 3t0, then the clock period of each clock control signal is 6t0. The first clock control signal sw_1 has a phase shift of π/2 from the second clock signal sw_2. sw_3 also has a phase shift of π/2 from sw_4. Da_1 and Da_2 are data signals loaded respectively to the data-input terminals DA_1 and DA_2, in which the first data-input terminal DA_1 is configured to load positive polarity signals and the second data-input terminal DA_1 is configured to load negative polarity signals.

In one frame of displaying time, when a gate-scanning signal G1 is applied to the first gate line gate_1, the thin-film transistors in the subpixels of Red, Green, Blue colors in the first row are all turned on by the gate turn-on signal or tamed off by the gate turn-off signal. The gate-scanning signal is progressively scanned one row after another to apply G2 to the second row following G1 being applied to the first row, then to apply G3 to the third row, and apply G4 to the fourth row, and so on. In an example, the time for the first gate line gate_1 to receive the gate turn-on signal is a period T1 and the time for the second gate line gate_2 to receive the gate turn-on signal is a next period T2. T1 also includes t11, t12, t13 three sub-periods and T2 also includes t21, t22, t23 three sub-periods.

In t11 sub-period of T1, data signal sw_1 is a high voltage signal that turns on each switch transistor M0_1 that connects to each corresponding first data line data_1 of each column of R subpixels of red color. A data signal $-V_R$ from the data-input terminal DA_2 is inputted to the first column of R subpixels (in a first column of pixels), making it a negative polarity. At the same tune, a data signal $+V_R$ from the data-input terminal DA_1 is inputted to the second column of R subpixels (in a second column pixels), making it a positive polarity.

Data signal sw_2 is a low voltage signal that turns off each switch transistor M0_2 that connects to each corresponding second data line data_2 of each column of R subpixels. Data signal sw_3 is a high voltage signal that turns on each switch transistor M0_1 that connects to each corresponding first data line data_1 of each column of G subpixels of green color. A data signal $+V_R$ from the data-input terminal DA_1 is inputted to the first column of G subpixels (in the first column of pixels). A data signal $-V_R$ from the data-input terminal DA_2 is inputted to the second column of G subpixels (in the second column of pixels). Data signal sw_4 is a low voltage signal that turns off each switch transistor M0_2 thru connects to each corresponding second data line data_2 of each column of G subpixels. At the same time, the first column of B subpixels is inputted with $-V_R$ and the second column of B subpixels is inputted with $+V_R$. This period, all G subpixels and B subpixels are precharged.

In t12 sub-period of T1, since sw_1 is a low voltage signal, M0_1 connected to data_1 is turned off and the first column of R subpixels is kept at $-V_R$ and the second column of R subpixels is kept at $+V_R$. Since sw_2 is a high voltage signal, M0_2 connected to data_2 is turned on. But as the thin-film transistors in respective RGB subpixels in all rows other than the first row are not turned on yet by the corresponding gate-scanning signal, thus no data signal is loaded into the corresponding subpixels anyway. sw_3 is a high voltage signal, allowing $+V_G$ data signal with positive polarity to be loaded from date-input terminal DA_1 to the first column of G subpixels. Additionally, it refreshes $+V_R$ that was loaded during t11. $-V_G$ data signal with negative polarity is loaded from the data-input terminal DA_2 to the second column of G subpixels and refreshes $-V_R$ that was loaded before in t11. sw_4 is a low voltage signal, turning off switch transistor M0_2 that connects the data_2. Again, the first column of B subpixels is inputted with $-V_G$ to refresh $-V_R$ loaded in t11 and the second column of B subpixels is inputted with $+V_G$ to refresh $+V_R$ loaded in t11.

In t13 sub-period of T1, sw_1 is a low voltage signal, turning off M0_1 connected to data_1 associated with each column of R subpixels. The first column of R subpixels is kept at $-V_R$ and the second column of R subpixels is at $+V_R$. sw_2 is a high voltage signal, turning on M0_2 connected to data_2 associated with each column of R subpixels. But no thin-film transistors in all rows other than the first row are opened, this clock signal has no effect sw_3 is a low voltage signal, turning off M0_1 connected to data_2 associated with each column of G subpixels. The first column of G subpixels is kept at $+V_G$ and the second column of G subpixels at $-V_G$. sw_4 is a high voltage signal, turning on M0_2 connected to data_2 associated with each column of G subpixels. But no thin-film transistors in all rows other than the first row are opened, this clock signal has no effect. Still, data signal $-V_B$ is loaded from data-input terminal DA_2 to the first column of B subpixels per column of pixels, making it in negative polarity that refreshes $-V_G$ loaded in t12. data signal $+V_B$ is loaded from data-input terminal DA_2 to the second column of B subpixels (in the second column of pixels), making it in positive polarity that refreshes $+V_G$ loaded in t12.

As seen above, when the first gate line gate_1 is scanned with a gate turn-on signal, applying different data signals sequentially from each data-input DA_a and providing each clock signal terminals SW_x with corresponding clock control signals sw_x with a phase shift can allow different subpixels in the first row to be loaded with corresponding data signals to complete data refreshing of each subpixel in the first row.

Figure 6:
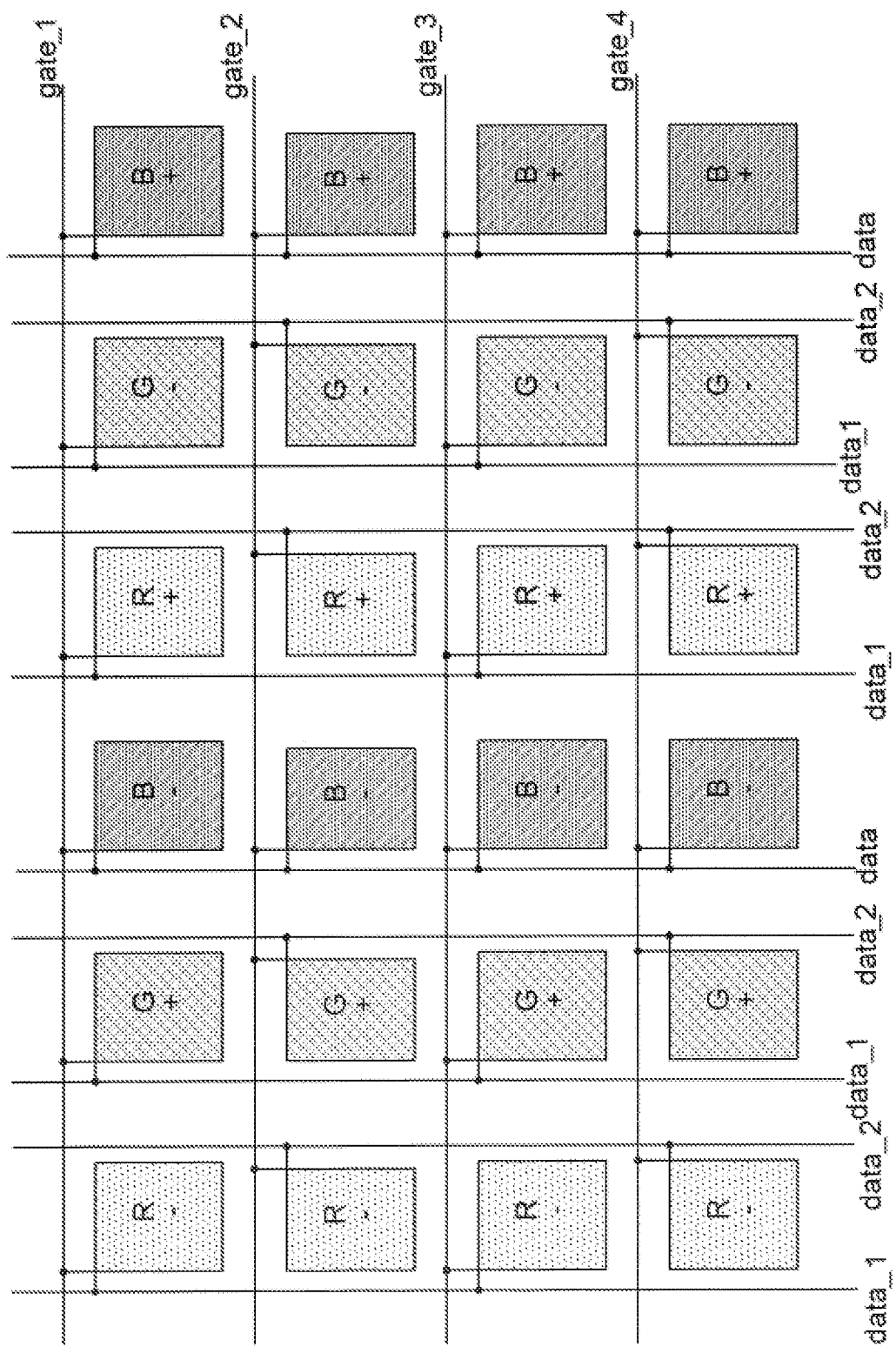
FIG. 6 is a schematic diagram of subpixel polarity within one frame of time for each subpixel in the pixel array substrate of FIG. 3 according to the embodiment of the present disclosure.

Similarly, when the second gate line gate_2 is scanned with a gate turn-on signal in T2 (including t21, t22, t23), as the gate-scanning signal continues to progressively scan one row after another in dine, the data signals can be sequentially loaded to subpixels in the second row from the data-input terminals DA_a via corresponding data lines under control of property designed clock control signals sw_x to turn on or off the corresponding switch M0_m. The details are folly illustrated in FIG. 3 and FIG. 5 and will not be repeated here. After all, each subpixel in different row and different column can be loaded with proper data signal at a desired polarity. Optionally, based on each pair of columns of pixels, the first column of R subpixels is set to negative polarity. Following that in the row direction, there are the second column of G subpixels and the third column of B subpixels in the first column of pixels, further the fourth column of R subpixels, the fifth column of G subpixels, and the sixth column of B subpixels, being setting with alternate polarities in alternate columns. FIG. 6 shows a schematic diagram of subpixel polarity within one frame of time for each subpixel in the pixel array substrate of FIG. 3 according to the embodiment of the present disclosure.

Referring to FIG. 3 and FIG. 5, the clock control signals sw_1 and sw_2 associated with R subpixel have a mutual phase shift of $\pi/2$ but a same clock period that is twice of the pulse width of the gate turn-on signal. Therefore, the clock frequency of sw_1 and sw_2 in FIG. 5 is reduced to $\frac{1}{2}f_R$ of the clock control signal sw_1 in FIG. 2. The parasitic capacitance of the data line data_1 associated with the clock control signal sw_1 in FIG. 5 is reduced to $\frac{1}{2}C_R$ of the data line associated with the clock control signal sw_1 in FIG. 2. The parasitic capacitance of the data line data_2 associated with the clock control signal sw_2 in FIG. 5 is also reduced to $\frac{1}{2}C_R$ of the data line associated with the clock control signal sw_1 in FIG. 2. Then total power consumption $P_R$ of all R subpixels can be expressed as:

$$P_R = \frac{1}{2}f_R \cdot \frac{1}{2}C_R \cdot V_R^2 + \frac{1}{2}f_R \cdot \frac{1}{2}C_R \cdot V_R^2 = \frac{1}{2}f_R C_R V_R^2.$$

The power consumption fear the red subpixels in the display panel can be reduced by half.

Similarly, the total power consumption $P_G$ of all G subpixels can be expressed as:

$$P_G = \frac{1}{2}f_G \cdot \frac{1}{2}C_G \cdot V_G^2 + \frac{1}{2}f_G \cdot \frac{1}{2}C_G \cdot V_G^2 = \frac{1}{2}f_G C_G V_G^2$$

The power consumption for the green subpixels in the display panel can be reduced by half.

In the example of FIG. 3, the column of B subpixels is associated with only one data line. It is not controlled by any switch but directly by the thin-film transistor in each subpixel under control of the gate-scanning signal. In principle, the power consumption $P_M$ for the whole pixel array substrate can be $P_M = \frac{1}{2}f_R C_R V_R^2 + \frac{1}{2}f_G C_G V_G^2 + f_B C_B V_B^2 = 2f_R C_R V_R^2$, if it is assumed that the power consumption for any subpixel of different color is the same. Thus, $P_M$ now is reduced by $\frac{2}{3}$. If each column of B subpixels is also associated with M=2 data lines like the column of R subpixels as well as the column of G subpixels in an alternative embodiment, by reducing each clock control signal frequency to $\frac{1}{2}$ of original one, the total power consumption for the pixel array substrate of the display panel can be reduced by half.

Figure 7:
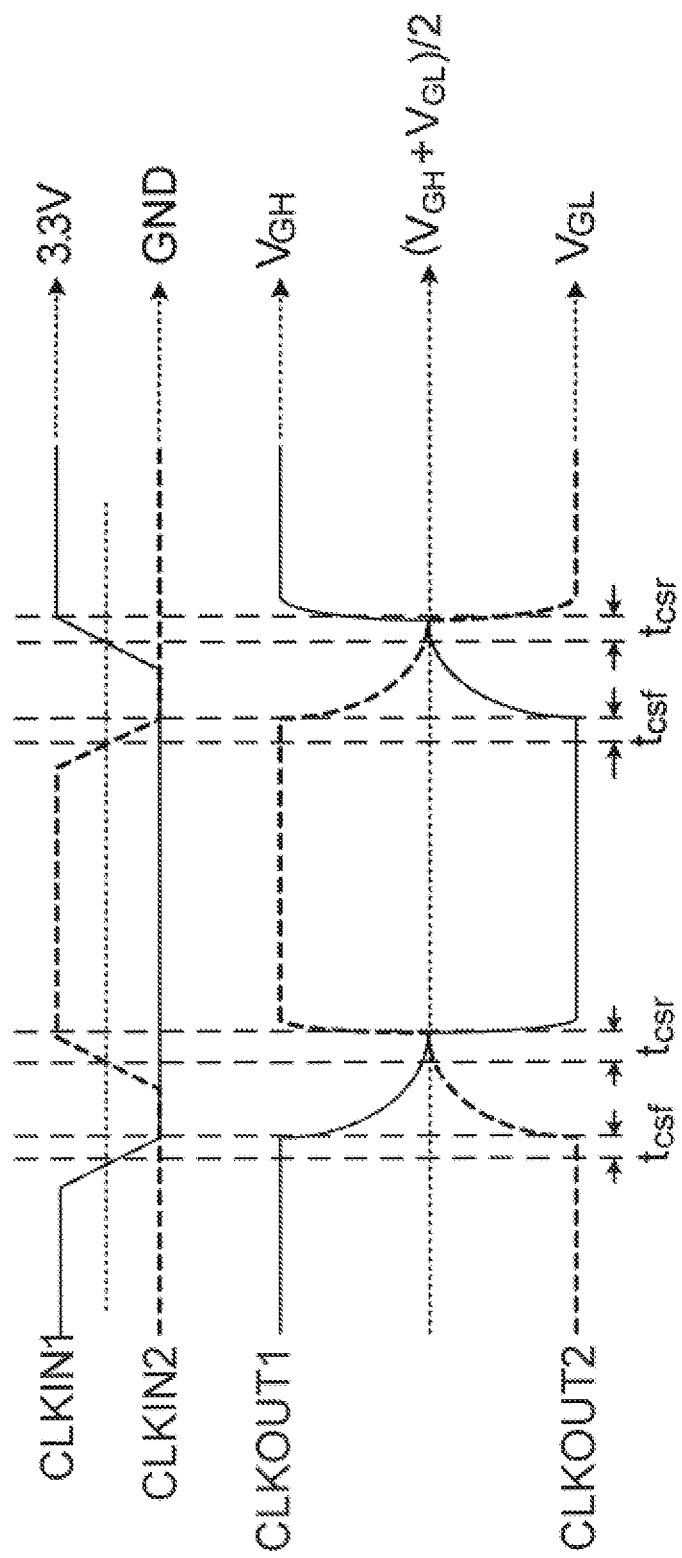
FIG. 7 is a timing waveform of control signals adopting charge sharing according to an embodiment of the present disclosure.

In a specific implementation of the pixel array substrate of the present disclosure, a level shifter can be employed to supply the clock control signal sw_x to the clock signal terminal SW_x. since sw_1 and sw_2 have opposite phase and sw_3 and sw_4 have opposite phase, a charge sharing technique can be applied in the level shifter to achieve the power consumption reduction. FIG. 7 is a timing waveform of control signals adopting charge sharing according to an embodiment of the present disclosure. Referring to FIG. 7, CLKIN1 and CLKIN2 are two input signals applied to the level shifter. CLKOUT1 and CLKOUT2 are two output signals outputted from the level shifter. $V_{GH}$ represents a voltage for controlling the switch transistor to be turned on. VGL represents a voltage for controlling the switch transistor to be turned off. $t_{caf}$ and $t_{car}$ are respective delay times of the charge sharing which adopts external resistor-capacitor (RC) unit to execute the control. In particular, the charge sharing technique is to use self-neutralization of charges generated respectively at a rising edge of the clock signal CLKIN1 and at a falling edge of the clock signal CLKIN2 to save charges for driving the clock signals and achieve the purpose of reducing power consumption. Optionally, adopting the charge sharing technique can reduce power consumption by 30%. Optionally, the power consumption can be reduced by about 70 mW or more.

Figure 8:
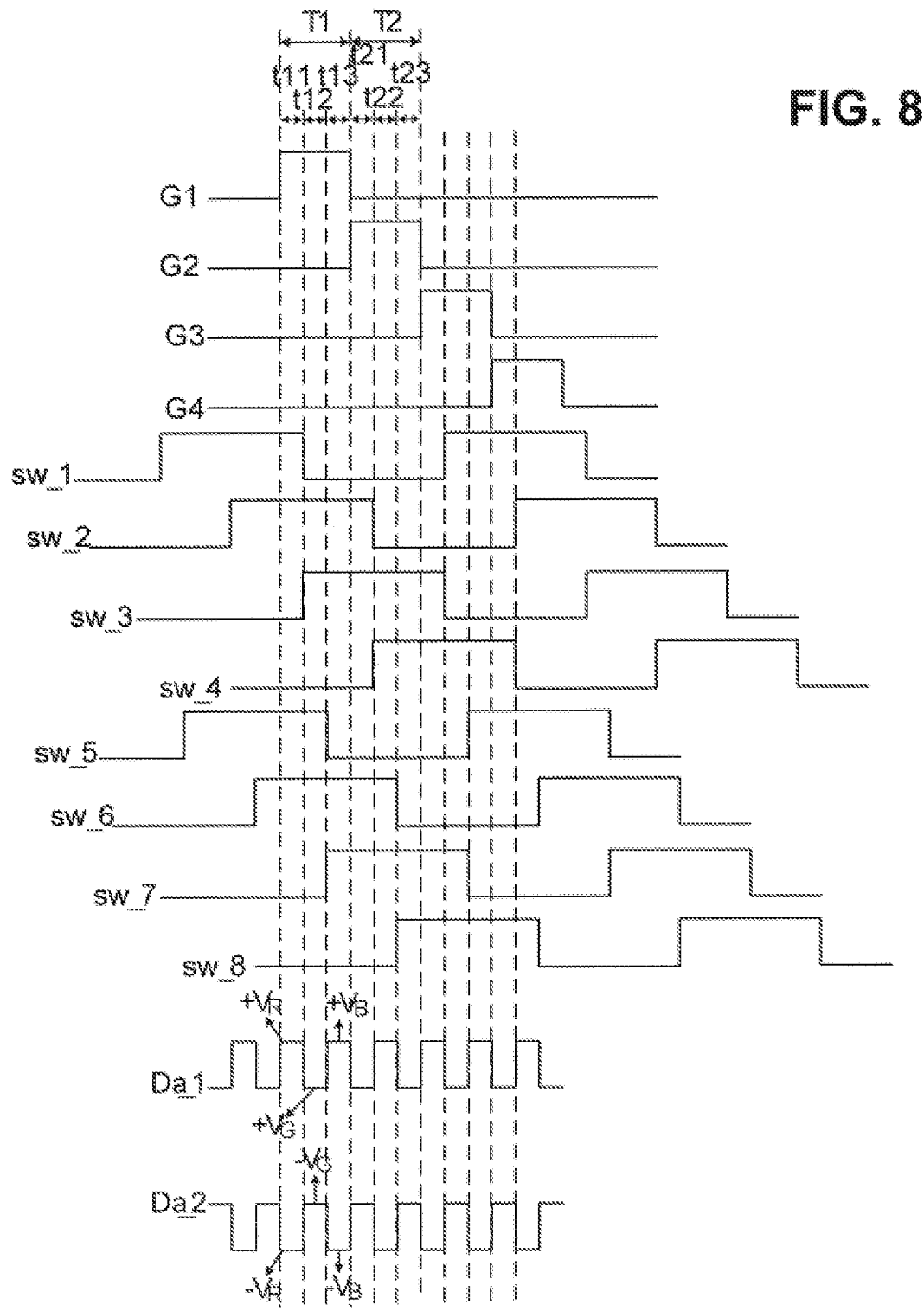
FIG. 8 is a timing waveform of control signals for the pixel array substrate of FIG. 4 according to another embodiment of the present disclosure.

FIG. 8 is a tuning waveform of control signals for the pixel array substrate of FIG. 4 according to another embodiment of the present disclosure. Referring to FIG. 8, G1~G4 respectively represent gate-scanning signals progressively applied to gate lines gate_1~gate_4 one after another. The high voltage level of the gate-scanning signal represents a gate turn-on signal having a pulse width. The low voltage level of the gate-scanning signal represents a gate turn-off signal. sw_1~sw_8 respectively represent different clock control signals applied to the clock signal terminals SW_1~SW_8. In particular, each clock signal sw_1~sw_8 has a same clock period which is set to be 4 times of the pulse width of the gate turn-on signal. For example, the pulse width of the gate turn-on signal is 3t0, then the clock period is 12t0. Additionally, clock control signals sw_1~sw_4 sequentially have a phase shift of $\pi/4$. Clock control signals sw_5~sw_8 sequentially also have a phase shift of $\pi/4$. Da_1 and Da_2 respectively represent two data signals loaded from the data-input terminals DA_1 and DA_2 per pair of columns of pixels in the display panel. If each pixel includes three subpixels: R subpixel, G subpixel, and B subpixel laid sequentially in a row direction, each data-input terminal is correspondingly responsible for loading data into three subpixels per row. Optionally, data-input terminal DA_1 always loads data signal in positive polarity and data-input terminal DA_2 always loads data signal in negative polarity.

In one frame of displaying time, the gate-scanning signals G1, G2 . . . are progressively scanned through the first gate line gate_1, the second gate line gate_2, . . . . In each scan, a corresponding gate line associated with a current row of pixels is scanned by the respective one gate-scanning signal with the gate turn-on pulse which allows the thin-film transistors associated with respective subpixels in the current row to be opened. During the same time of this scan, the gate turn-off signals are applied to all other rows other than the current row to turn off all thin-film transistors associated with the subpixels in those rows. A first scan over the first gate line gate_1 is named T1 followed by a second scan over the second gate line gate_2 of T2. T1 includes three sub-periods t11, t12, and t13 for allowing 4 switches being controlled to load respective data signals via four data lines to each column of subpixels in each column of pixels. Similarly, T2 also includes three sub-periods t21, t22, and t23.

Referring to FIG. 4 and FIG. 8, four clock signals are used for controlling four distinct switches connected respectively to four distinct data lines associated with a first column of R subpixels in a first one per pair of columns of pixels in the display panel to load data signals from DA_2 of two data-input terminals. Also, other four clock signals are used for controlling different four distinct switches connected respectively to four different data lines associated with a second column of G subpixels in the first one per pair of columns of pixels in the display panel to load data signals from DA_1 of the two data-input terminals. In this example, the third column of B subpixels in the first column of pixels is not controlled by any switch bid directly controlled by thin-film transistors in respective subpixels in the column and the data signal is loaded from the DA_2 via a single data line. Optionally, in an alternative embodiment, this column of B subpixels on also be associated with 4 data lines like the column of R subpixels and the column of G subpixels.

Further, four clock signals rue used for controlling four distinct switches connected respectively to four distinct data lines associated with a first column of R subpixels in a second one per pair of columns of pixels in the display panel to load data signals from DA_2 of two data-input terminals. Also, other four clock signals are used for controlling different four distinct switches connected respectively to four different data lines associated with a second column of G subpixels in the second one per pair of columns of pixels in the display panel to load data signals from DA_1 of the two data-input terminals. The third column of B subpixels in the second column of pixels is also not controlled by any switch but directly controlled by thin-film transistors in respective subpixels in the column and the data signal is loaded front tire DA_1 via a single data line. Optionally, in an alternative embodiment, this column of B subpixels can also be associated with 4 data lines like the column of R subpixels and the column of G subpixels.

The timing operation of the pixel array substrate involving FIG. 4 and FIG. 8 is substantially similar to that involving FIG. 3 and FIG. 5, except that M=4 in FIG. 4 and FIG. 8 rather than M=2 in FIG. 3 and FIG. 5. The details of the data loading from respective data-input terminals to corresponding subpixels in each column via corresponding data line under control of timely designed clock control signals when the gate-scanning signal is progressively scanning over row by row in the display panel have been illustrated clearly in the example of FIG. 3 and FIG. 5 and will not be repeated here for FIG. 8. In general, four clock control signals sw_1~sw_4 associated with a column of R subpixels are sequentially shifted $\pi/4$ in phase and have a clock period that is set to be 4 times of the pulse width of a gate turn-on signal. Therefore, the clock frequency of the clock centred signals sw_1~sw_4 in FIG. 8 is $\frac{1}{4}f_R$ compared to that of clock signal sw_1 in FIG. 2. Each parasitic capacitance of the data line associated with each of four clock control signals sw_1, sw_2, sw_3, and sw_4 in FIG. 8 is also just $\frac{1}{4}C_R$ of that associated with the clock signal sw_1 in FIG. 2. Thus, total power consumption PR of R subpixels in the display panel can be expressed as: $P_R=4\times\frac{1}{4}\cdot f_R\cdot\frac{1}{4}\cdot C_R\cdot V_R^2=\frac{1}{4}\cdot f_R C_R V_R^2$, i.e., reducing to just $\frac{1}{4}$ of original power consumption.

Similarly, the power consumption $P_G$ of all G subpixels is reduced to $\frac{1}{4}$ of original one. For the blue subpixels, i.e., B subpixels, no saving of power consumption in this example. Thus, total power consumption of the pixel array substrate is $P_M=\frac{1}{4}\cdot f_R C_R V_R^2+\frac{1}{4}\cdot f_G C_G V_G^2+f_B C_B V_B^2=\frac{3}{2}\cdot f_R C_R V_R^2$. In principle, the total power consumption $P_M$ can be reduced by half. Optionally, when each column of subpixels is associated with 4 data lines, by setting the clock frequency of different clock control signals applied to the clock signal terminals to control the connection of each of four data lines to corresponding data-input terminals, the total power consumption of the display panel can be reduced to $\frac{1}{4}$ of original one. In a specific embodiment, a level shifter is used to supply clock signals sw_x to the clock signal terminals SW_x shown in FIG. 4. sw_1 and sw_3 have opposite phase. sw_2 and sw_4 have opposite phase. sw_5 and sw_7 have opposite phase. sw_6 and sw_8 have opposite phase. Using charge share technique inside the level shifter can achieve the power consumption reduction.

In another aspect, the present disclosure provides a method of driving the pixel array substrate. The method includes a step of applying a gate turn-on signal with a pulse width progressively one-after-another to scan through a plurality of gate lines in each frame of displaying time. The plurality of gate lines is respectively associated with a plurality of rows of subpixels in the pixel array substrate. The method further includes a step of applying multiple data signals to respective multiple data-input terminals. Additionally, the method includes a step of laying at least one data line to be associated with each column of subpixels in the pixel array substrate, wherein N numbers of columns of subpixels per each column of pixels being respectively associated with N sets of M numbers of data lines. N is an integer equal to or greater than 1 and M being an even number equal to or greater than 2. Furthermore, the method includes a step of providing M numbers of switches configured to control M groups of subpixels in respective one of N numbers of columns of subpixels per column of pixels to be connected with one of the multiple data-input terminals respectively via a distinct set of M numbers of data lines. Moreover, the method includes a step of applying M numbers of clock control signals respectively to M numbers of clock-signal terminals that are respectively connected to M numbers of control terminals of the M numbers of switches. Each of the M numbers of clock control signals has a phase shift from one another of the M numbers of clock control signals but with a same period that is M times of the pulse width of the gate turn-on signal.

Optionally in the method, setting each clock control signals with a phase shift allows that the subpixels can be loaded with corresponding data signals when they are opened by a corresponding gate turn-on signal. Setting the clock period the same for all clock signals and equal to M times of a pulse width of the gate turn-on signal allows the clock frequency f to be reduced to achieve power consumption reduction based on formula $P=fCV^2$.

Optionally in a specific embodiment, the step of applying multiple data signals to respective multiple data-input terminals is achieved by inputting different data signals one-after-another to each of multiple data-input terminals (fairing each pulse width of the gate turn-on signal being applied to one gate line associated with a corresponding one row of subpixels. Additionally, the step of applying multiple data signals to respective multiple data-input terminals is achieved by inputting the M numbers of clock control signals to control inputting the different data signals one-after-another from each of the multiple data-input terminals via respective one of the M numbers of data lines to each subpixel of one group within the M groups of subpixels in the respective one of N numbers of columns of subpixels per column of pixels.

Optionally in a specific implementation of the method, the m-th data line of a set of M numbers of data lines is coupled to each subpixel in a m-th group of the M groups distributed in every [M·k−(M−m)]-th raw of the respective one of N numbers of columns of subpixels per column of pixels, m is an integer varying from 1 to M, and k is a positive integer. The step of applying M numbers of clock control signals includes applying at least two clock control signals with a phase shift of π/M respectively to two of a set of M numbers of data lines that are respectively connected to two subpixels in respective two neighboring rows. For example as shown in FIG. 5, M=2, the first data line of the two data lines is coupled to subpixels in every odd number rows of the column of subpixels and the second data line is coupled to subpixels in every even number rows of the column of subpixels.

Optionally in a specific implementation of the method, the step of applying multiple data signals includes applying two data signals with same polarity respectively to any two of a set of M numbers of data lines associated with the at respective one of N numbers of columns of subpixels and applying two data signals with opposite polarities to any two data lines respectively associated with two neighboring columns of subpixels. Optionally, all subpixels in a same column of subpixels are loaded with data having same polarity. All subpixels in two neighboring columns of subpixels are loaded with data having opposite polarities.

In yet another aspect, the present disclosure provides a display apparatus including a pixel array substrate described herein. Optionally, the display apparatus can be a liquid crystal based display apparatus including a mating substrate correspondingly disposed against the pixel array substrate and a liquid crystal layer in between. Optionally, the display apparatus includes a level shifter configured to provide different clock control signals with a phase shift to respective data-input terminals. All these clock signals are set with a same clock period that is equal to M times of a pulse width of the gate tom-on signal scanned progressively through all rows of pixels during each frame of displaying time. Optionally, the display apparatus includes one selected from smart phone, tablet computer, television, displayer, notebook computer, digital picture frame, nevigator, and any product or component that bears display function.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pixel array substrate comprising:
a plurality of pixels arranged in an array having multiple data-input terminals, each pixel including one or more subpixels along row direction, N numbers of columns of subpixels per each column of pixels being respectively associated with N sets of M numbers of data lines, N being an integer equal to or greater than 1, M being an even number equal to or greater than 2; and
N sets of M numbers of switches coupled respectively to the N sets of M numbers of data lines, control terminals of each set of M numbers of switches being respectively coupled to M numbers of clock-signal terminals to respectively receive M numbers of clock control signals to control M groups of subpixels in each corresponding one column of subpixels to be connected with one of the multiple data-input terminals respectively via each corresponding set of M numbers of data lines;
wherein an m-th data line of the M numbers of data lines is coupled to each subpixel in an m-th group of the M groups distributed in every [M·k−(M−m)]-th row in each corresponding one column of subpixels, m being an integer varying from 1 to M, and k being a positive integer; and
any two data lines from a set of M numbers of data lines associated with one column of subpixels are configured to connect to a same one of the multiple data-input terminals and any two data lines respectively associated with two neighboring columns of subpixels are configured to connect to two different ones of the multiple data-input terminals.

2. The pixel array substrate of claim 1, wherein each column of subpixels per each column of pixels includes subpixels of a same color associated with at least one data line, any two subpixels in respective two columns of subpixels per one column of pixels include subpixels of two different colors.

3. The pixel array substrate of claim 1, wherein each m-th data line of a corresponding one set of M numbers of data lines associated with each column of subpixels of a same color in all columns of pixels in the array is configured to be controlled respectively by a different switch sharing a same clock control signal received from a same m-th one of the M numbers of clock-signal terminals.

4. The pixel array substrate of claim 1, wherein each pixel includes a red color subpixel, a green color subpixel, and a blue color subpixel laid along a row direction.

5. The pixel array substrate of claim 4, wherein each of up to three columns of subpixels of up to three colors selected from the red color subpixel, green color subpixel, and blue color subpixel per column of pixels in the array is associated with a distinct set of M numbers of data lines.

6. The pixel array substrate of claim 1, wherein each switch includes a switch transistor having a gate electrode served as a control terminal, a first electrode coupled to a corresponding one of the multiple data-input terminals, and a second electrode coupled to a corresponding one of a distinct set of M numbers of data lines.

7. The pixel array substrate of claim 6, wherein the switch transistor is a back channel etch-type transistor, a transistor having an active-layer comprising a metal oxide semiconductor material, or a back channel etch-type transistor having an active-layer comprising a metal oxide semiconductor material.

8. The pixel array substrate of claim 6, wherein the switch transistor is an etching stop layer type transistor or top-gate type transistor having an active-layer comprising a metal oxide semiconductor material.

9. The pixel array substrate of claim 1, wherein the set of M numbers of data lines associated with one column of subpixels includes at least two data lines respectively laid on two opposite sides of the one column of subpixels.

10. The pixel array substrate of claim 1, further comprising a plurality of gate lines crossing over with insulation from the data lines, wherein each row of subpixels is associated with one of the plurality of gate lines to receive a gate-turn-on signal with a pulse width, wherein each of the M numbers of clock control signals has a phase shift from one another of the M numbers of clock control signals but with a same period being M times of the pulse width.

11. The pixel array substrate of claim 1, wherein the multiple data-input terminals comprise two sets of data-input terminals, each pair of columns of pixels being associated with two distinct data-input terminals respectively from the two sets of data-input terminals configured to supply with data signals with respective two opposite polarities.

12. A method of driving a pixel array substrate comprising:
applying a gate turn-on signal with a pulse width progressively one-after-another to scan through a plurality of gate lines in each frame of displaying time, the plurality of gate lines being respectively associated with a plurality of rows of subpixels in the pixel array substrate;
applying multiple data signals to respective multiple data-input terminals;
laying at least one data line to be associated with each column of subpixels in the pixel array substrate, wherein N numbers of columns of subpixels per each column of pixels is respectively associated with N sets of M numbers of data lines, N being an integer equal to or greater than 1, M being an even number equal to or greater than 2;
providing M numbers of switches configured to control M groups of subpixels in a respective one of N numbers of columns of subpixels per column of pixels to be connected with one of the multiple data-input terminals respectively via a distinct set of M numbers of data lines;
applying M numbers of clock control signals respectively to M numbers of clock-signal terminals that are respectively connected to M numbers of control terminals of the M numbers of switches;
wherein each of the M numbers of clock control signals has a phase shift from one another of the M numbers of clock control signals but with a same period that is M times of the pulse width of the gate turn-on signal; and
wherein applying M numbers of clock control signals comprises applying at least two clock control signals with a phase shift of it/M respectively to two of a set of M numbers of data lines that are respectively connected to two subpixels in respective two neighboring rows.

13. The method of claim 12, wherein applying multiple data signals to respective multiple data-input terminals comprises inputting different data signals one-after-another to each of multiple data-input terminals during each pulse width of the gate turn-on signal being applied to one gate line associated with a corresponding one row of subpixels; and inputting the M numbers of clock control signals to control inputting the different data signals one-after-another from each of the multiple data-input terminals via respective one of the M numbers of data lines to each subpixel of one group within the M groups of subpixels in the respective one of N numbers of columns of subpixels per column of pixels.

14. The method of claim 12, wherein a m-th data line of a set of M numbers of data lines is coupled to each subpixel in a m-th group of the M groups distributed in every [M·k−(M−m)]-th row of the respective one of N numbers of columns of subpixels per column of pixels, m being an integer varying from 1 to M, and k being a positive integer.

15. The method of claim 12, further comprising connecting any two data lines respectively associated with two neighboring columns of subpixels to two different ones of the multiple data-input terminals configured to respectively supply two data signals with opposite polarities.

16. The method of claim 12, wherein applying multiple data signals comprises applying two data signals with same polarity respectively to any two of a set of M numbers of data lines associated with the respective one of N numbers of columns of subpixels and applying two data signals with opposite polarities to any two data lines respectively associated with two neighboring columns of subpixels.

17. A display apparatus comprising a pixel array substrate of claim 1 and a level shifter for providing different clock control signals with a relative phase shift.

18. A pixel array substrate comprising:
a plurality of pixels arranged in an array having multiple data-input terminals, each pixel including one or more subpixels along row direction, N numbers of columns of subpixels per each column of pixels being respectively associated with N sets of M numbers of data lines, N being an integer equal to or greater than 1, M being an even number equal to or greater than 2; and
N sets of M numbers of switches coupled respectively to the N sets of M numbers of data lines, control terminals of each set of M numbers of switches being respectively coupled to M numbers of clock-signal terminals to respectively receive M numbers of clock control signals to control M groups of subpixels in each corresponding one column of subpixels to be connected with one of the multiple data-input terminals respectively via each corresponding set of M numbers of data lines;
wherein each pixel includes a red color subpixel, a green color subpixel, and a blue color subpixel laid along a row direction; and
each of up to three columns of subpixels of up to three colors selected from the red color subpixel, green color subpixel, and blue color subpixel per column of pixels in the array is associated with a distinct set of M numbers of data lines.

* * * * *